United States Patent [19]

Wakabayashi et al.

[11] Patent Number: 4,582,763

[45] Date of Patent: Apr. 15, 1986

[54] PLASTIC PART RESISTANT TO DEICING SALT

[75] Inventors: Hiroyuki Wakabayashi, Kariya; Tamotsu Matsubara, Chiryu, both of Japan

[73] Assignee: Nippodenso Co., Ltd., Kariya, Japan

[21] Appl. No.: 622,556

[22] Filed: Jun. 20, 1984

[30] Foreign Application Priority Data

Jun. 27, 1983 [JP] Japan ............................. 58-115608

[51] Int. Cl.⁴ ............................................. B32B 27/08
[52] U.S. Cl. ............................ 428/475.5; 428/474.4; 428/474.9; 528/310; 528/355; 528/323
[58] Field of Search ............... 428/474.4, 475.5, 474.9; 528/310, 355, 323

[56] References Cited

U.S. PATENT DOCUMENTS

| | | | |
|---|---|---|---|
| 4,386,197 | 5/1983 | Panoch et al. | 528/310 |
| 4,414,362 | 11/1983 | Lenke et al. | 528/323 |
| 4,420,608 | 12/1983 | Morello | 528/310 |
| 4,446,304 | 5/1984 | Gaymans et al. | 528/335 |
| 4,461,885 | 7/1984 | Wu | 528/310 |
| 4,465,821 | 8/1984 | Nielinger et al. | 528/335 |
| 4,482,695 | 11/1984 | Barbee et al. | 528/335 |

*Primary Examiner*—Edith Buffalow
*Attorney, Agent, or Firm*—Cushman, Darby & Cushman

[57] ABSTRACT

A plastic part composed primarily of a polyamide resin such as 6-nylon blended with another mutually-soluble resin, the part capable of withstanding environmental stress cracking caused by deicing salts containing calcium chloride. The resin blend has a saturation water absorbability of less than 6.0%. Under use conditions, such plastic parts, typically in the form of radiator parts, water separators and the like, have very few cracks and have an excellent strength and thermal resistance.

8 Claims, 5 Drawing Figures

FIG.1
FIG.2
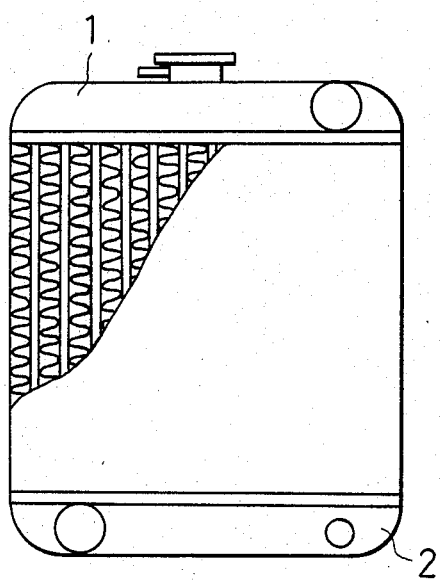
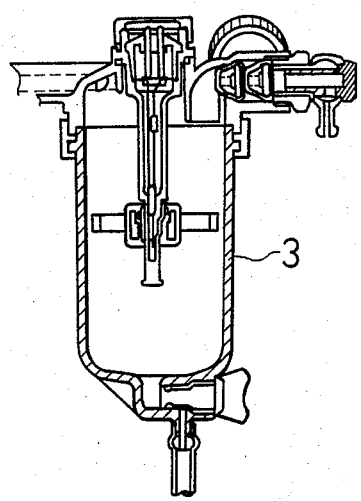
FIG.3
FIG.4
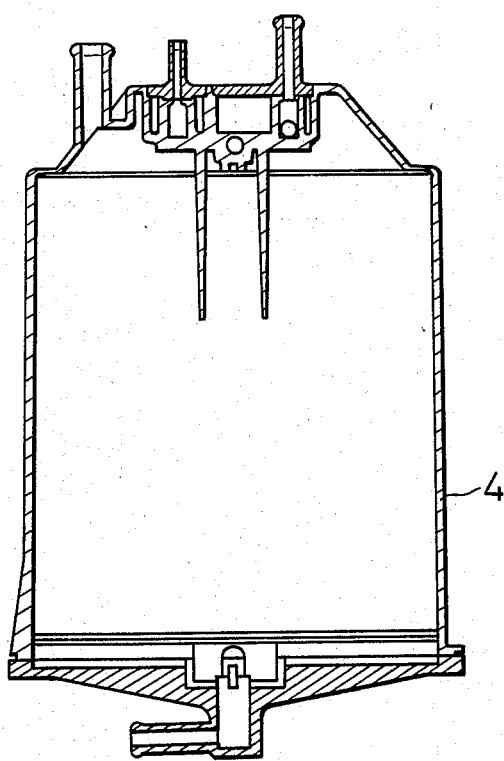
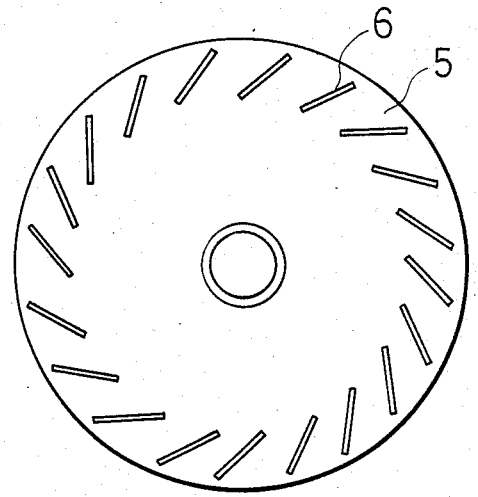
FIG.5
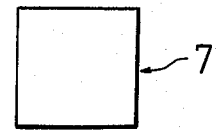

PLASTIC PART RESISTANT TO DEICING SALT

BACKGROUND OF THE INVENTION

1. Field of the Invention

This invention relates to a plastic part mainly composed of polyamide resin.

2. Description of the Prior Art

In recent years, many plastic parts have been used in automobiles to reduce their weight and labor for fabrication of their parts. Particularly, 6-nylon and 6,6-nylon are preferably used for plastic parts due to their excellent strengths and thermal resistances. However, it has been found that cracks are likely to occur in plastic parts made of 6-nylon, or 6,6-nylon, or glass fiber reinforced 6-nylon or 6,6-nylon, if they are in contact with calcium chloride included in deicing salts scattered on roads in winter.

SUMMARY OF THE INVENTION

The present invention was completed by studying the problem.

Accordingly, one object of the present invention is to prevent environmental stress cracking of polyamide parts exposed to calcium chloride contained in deicing salts.

The other object of the present invention is to provide a plastic part composed of materials having excellent strength against stress cracking.

A further object of the present invention is to provide a plastic part that has durability against calcium chloride in deicing salts.

BRIEF DESCRIPTION OF DRAWINGS

For purposes of illustration and to make the description more clear, reference is made to the accompanying drawings in which:

FIG. 1 shows a front view of the radiator of Embodiment 1;

FIG. 2 shows a sectional view of the segmentor (water separator) case of Embodiment 2;

FIG. 3 shows a sectional view of the canistor case of Embodiment 3;

FIG. 4 shows a front view of the alternator fan of Embodiment 4, and

FIG. 5 shows a front view of the square plate of Embodiment 5, which was taken as a typical example of the plastic parts of the present invention.

DETAILED DESCRIPTION OF THE INVENTION

The inventors of this invention studied this problem and found that such cracks are generated by frequent induction of internal stresses within a plastic part since such part is frequently in contact with calcium chloride included in deicing salts on roads and is subjected to repetitions of heating and cooling. And, the inventors have found that cracking can be prevented by reduction of the saturation water absorbability of polyamide resin used in the above-mentioned plastic parts. The present invention is based on the findings described above.

Description will be made below about the mechanism of the cracking due to calcium chloride in 6-nylon or 6,6-nylon, or glass-fiber reinforced 6-nylon or 6,6-nylon.

In a plastic part, where the outer surface of the part is exposed to ambient air and the inner surface thereof is in contact with water or an aqueous solution, the water absorbed in the outer surface is in equilibrium with ambient air and the inner surface is saturated with water. If the ambient temperature increases or the ambient air becomes dry, the outer surface layer is dried and large tensile strains are induced in the outer layer, since the inner surface layer remains wet.

It has been found that a significant reduction in elongation to rupture is observed with 6-nylon and 6,6-nylon which have been dried after contact with a concentrated aqueous solution of calcium chloride. The nylons in such condition are similar to the material in the outer surface layer described above.

Thus, cracking will occur in the outer surface layer which is in contact with calcium chloride when the elongation to rupture of the outer layer is exceeded by the tensile strain induced in the same layer.

In such plastic parts, as a radiator tank, a sedimentation tank, or a water valve, there is an outer surface layer which is in contact with ambient air and an internal surface layer which is in contact with water or an aqueous cooling liquid. The former is subject to repetitions of drying and wetting due to ambient humidity changes and water splashes from roads, while the latter is in a sufficiently wet condition at all times.

When the outer surface layer is dried, large tensile strains are induced on the layer, since the internal layer remains wet. On the other hand, since the outer layer which has been in contact with an aqueous solution of calcium chloride at a high concentration has a reduced elongation to rupture, the tensile strains exceed the elongation to rupture, leading to crack generation.

Even in plastic parts which are not designed to contain water therein, cracks may occur since the elongation to rupture of the outer layer is reduced owing to contact with an aqueous solution of calcium chloride and tensile strains are induced due to the difference in water contents in the outer and inner layers, in the ease when the interior of a plastic part is dewy or in contact with very wet air.

It has been found from the experiment described below that 1.0 mm is the critical thickness of a section of a polyamide part above which cracks are likely to occur.

In an experiment made by the inventors, 6-nylon and 6,6-nylon test pieces with various thicknesses (20 mm×20 mm×0.5 mm, 20 mm×20 mm×0.7 mm, 20 mm×20 mm×1.0 mm, 20 mm×20 mm×2.0 mm, 20 mm×20 mm×3.0 mm) were immersed in a hot water of 100° C. for 40 hrs, and then cooled at room temperature. And, an aqueous solution of 5% in weight calcium chloride was applied on one side of the test pieces. They were dried in an oven of 100° C. for 2 hrs, and cooled at room temperature, followed by water cleaning, and checking for the presence of cracks. According to the experimental results, it was found that cracks were clearly observed in all the test pieces with thicknesses larger than 1.0 mm. In test pieces thinner than 1.0 mm, there was little difference in the dry or wet state between the inner and outer surface layers, which resulted in smaller strains and therefore no cracking. However, cracking occurred in test pieces thicker than 1.0 mm, for the reason described above.

As easily understood from the above description, the object of the present invention is to prevent environmental stress cracking of polyamide parts exposed to calcium chloride included in deicing salts, by lowering the saturation water absorbability to less than 6.0% in water weight of such polyamide resin as 6-nylon, 6,6-nylon, glass-fiber reinforced 6-nylon, or 6,6-nylon, based on the following reasons;

(1) Tensile strains induced in the outer surface layer can be reduced due to reduced dimensional difference by water absorption between the internal and outer surface layers.

(2) Reduction in the elongation to rupture of the outer surface layer can be suppressed by reducing the amount of calcium chloride impregnating into the resin through the medium of water.

In more detail, the present invention relates to use of a polyamide resin with a saturation water absorbability less than 6.0%, for plastic parts such as automotive radiator tanks which contact water on one side of the section and ambient air on another side, have a thickness larger than 1.0 mm and are repeatedly heated above 60° C.

The low water absorbability polyamide resin with a saturation water absorbability less than 6.0% and including no aromatic ring in the molecule, as described above, includes, (1) polyamide resins such as 6,10-nylon and 6,12-nylon, which are produced by polycondensation of hexamethylene diamine or a diamine with a methylene group longer than that of hexamethylene diamine and a dicarboxylic acid with a methylene group longer than that of adipic acid, and (2) polyamide resins such as 11-nylon and 12-nylon, which are produced by ring-opening polymerization of a lactum with a methylene group longer than that of $\epsilon$-caprolactum.

The mixture mainly composed of a polyamide resin, with a saturation water absorbability less than 6.0%, includes modified 6-nylon or modified 6,6-nylon with a saturation water absorbability less than 6.0% by blending 6-nylon and/or 6,6-nylon with one or more than one of the following resins which are mutually soluble with the 6-nylon and/or 6,6-nylon, in an amount of more than 30% by weight, the polyamide resin which is produced by polycondensation of hexamethylene diamine or a diamine with a methylene chain group longer than that of hexamethylene diamine and a dicarboxylic acid with a methylene chain group longer than that of adipic acid, the polyamide resin which is produced by poly condensation of an amino acid with a methylene chain group longer than that of $\epsilon$-aminocaproic acid, the polyamide resin which is produced by ring-opening polymeritation of a lactum with a methylene chain group longer than that of $\epsilon$-caorolactum, or one of the oletinic ionomer resins, such as those with trade names of Surlyn, Himilan, or Corporene.

In the present invention, a saturation water absorbability of a resins, is expressed as the value of the resin immersed in water of 23° C.

When plastic parts are made of the above mentioned polyamide resins or a mixture including a polyamide resin as the main component, the parts exhibit high strength and high heat resistance, and are highly resistant to deicing salts.

In addition, as long as the properties of the above described polyamide resins are not significantly varied, the polyamide resins or the polyamide-based mixtures may include reinforcing materials such as glass fibers, pigments, age resistant additives and extenders.

The plastic parts or components relevant to the present invention, which have a vessel-like, hose-like, or other shape with a section which is in contact with water inwardly and in contact with ambient air outwardly, and are subjected to repetitive heating above 60° C., include automotive radiator tanks, sedimentation tanks for diesel injection pumps, and water valves in automobiles.

And, the plastic parts which have a vessel-like, hose-like, or other shape with a section thicker than 1.0 mm and are subjected to repetitive heating above 60° C., include casings of canisters for adsorbing evaporated fuel, and fans of alternators used as generators, in automobiles.

The above-described radiator tank, which contains water for engine cooling, keeps warm water therein and is repeatedly heated by the heat from the cooling water.

The sedimentation casing, used for separating water from light oil and retaining the water, is repeatedly heated by the heat accumulated in an engine room or compartment.

The water valve used for transferring engine cooling water to heating equipment retains warm water and is repeatedly heated by the heat from the cooling water.

The canister casing containing active carbon for adsorbing gasoline vapor has a section thicker than 1 mm and is heated by heat of adsorption and heat accumulated in an engine room.

And, the alternator fans used for cooling an automotive alternator generating alternating current has a section thicker than 1 mm and is heated by the heat accumulated in an engine room.

DESCRIPTION OF THE PREFERRED EMBODIMENT

The present invention will now be described in detail by way of preferred embodiments.

Embodiment 1

Plastic parts of the present embodiment are employed an upper tank 1 and lower tank 2 of an automobile radiator, which are shown in FIG. 1. As the polyamide resins, various glass fiber reinforced thermoplastic resins shown in Table 1 were used and from these resins said tanks were injection-molded. The molded products from No. 1 to No. 8 in Table 1 are the plastic parts resistant to deicing salt according to the present invention, while the molded products from No. 101 to No. 103 are the conventional ones.

As the tests for evaluating the resisance of the plastic parts against deicing salt following methods A, B and C were used;

Test method A

Several radiators provided with said plastic tanks made from each of the polyamide resins are offered as test pieces. As a pretreatment, each of the radiators was immersed into hot water of 80° C. for 20 hrs, then taken out, and a common cooling liquid for a radiator was added. The radiator was closed tightly, then put in an over at 100° C. and kept for 24 hrs. For drying the outer surfaces the tanks of the radiator was taken out of the oven and cooled. Next, each of the radiators was subjected to a cycle test, in which 5% calcium chloride aqueous solution was completely coated on the outer surfaces of each of the preteated plastic tanks. Then, each of the radiators was placed and kept in an atmosphere of 100° C. for 2 hrs, for drying the aqueous solution thus coated, then left in an atmosphere at room temperature for 1 hr, and finally washed with water. A series of the above procedures consists of one cycle of the cycle test.

Practically, the repeated cycle tests were carried out with 10, 20, 40 and partially 100 cycles. After testing, each of the tested tanks was checked by means of a "penetration test" with regard to the crack. Each of the cracked parts found were cut off, and the depth of each of the cracks, which was defined as a straight distance from the surface to the bottom end of the crack, was measured by means of a microscope.

Test method B

The testing procedures are the same as the method A except the calcium chloride aqueous solution. The calucium chloride solution of the test method of B is of a concentration of 40% (weight %).

Test method C

The testing procedures are the same as the method B, but the pre-treatments were not carried out.

Table 1 reports the saturation water absorptivities (saturation water absorptivity in water of 23° C.) and measured crack depths. Also in Table 1, the symbol $\epsilon$ shows 6,12-nylon; 6,10-nylon, F; a blend of 6,6-nylon and 6,12-nylon having a blending ratio of 1/1, G; a blend of 6,6-nylon and 6,10-nylon and having a blending ratio of 1/1, H; a blend of 6,6-nylon and 6,12-nylon having a blending ratio of 1/1, I; a blend of 6,6-nylon and Olefinic Ionomer having a blending ratio of 7/3, J; a blend of 6,6-nylon and Olefinic Ionomer having a blending ratio of 6/4, Y; 6,6-nylon and Z; 6-nylon respectively.

As is clear from Table 1, the tanks of No. 101 to 103 made from conventional 6,6-nylon or 6-nylon had cracks of 1.6 to 2.2 mm deep after the test of 10 cycles, while the tanks of No. 1 to 8 according to the present invention had cracks of only 0.0 to 1.2 mm deep even after the test of 40 cycle. The growing speed of cracks of the tanks of the present invention was quite slow. Especially, on the tanks made from 6,12-nylon or the blend of 6-nylon and Olefinic Ionomer having a blending ratio of 6/4 there were never observed any cracks at all.

Embodiment 2

As the plastic part of the present embodiment is employed a segmentor (Water-separator) case 3 for a Diesel injection pump shown in FIG. 2.

Thermo-plastic resins shown in Table 2, were used and injection molded to produce the segmentor case. The symbols in the table, G, J, D, F, and Z shown the practice of the same symbols in Table 1, furthermore, K shows a blend of 6-nylon and Olefinic Ionomer=3/7.

The molded products of Nos. 9 to 13 in Table 2 are the plastic parts according to the present invention, while No. 104 is a conventional plastic part.

As for the test for evaluating the resistance of the plastic parts, a number of the segmentors were offered which were provided with each of the cases molded from the corresponding plastics. At first, each segmentor was submitted to a pre-treatment, that is, it was immersed into hot water of 80° C. for 24 hrs, taken out and after water was filled therein, and left in an atmosphere of 100° C. for 20 hrs. Thus, after the pretreatment, each of the segmentors was submitted to the cycle tests, wherein each segmentor was coated on the outer surface thereof with 5% calcium chloride aqueous solution, then left in an atmosphere of 100° C. for 2 hrs, and after leaving it at the room temperature for 1 hr, washed with water. One series of such steps was taken as one cycle, and such cycle or cycles were applied to each of the segmentors.

Practically, several segmentors of each types were tested at the same time. And each one of the segmentors was taken out after the corresponding cycle or cycles of 1, 5, 10 and 20, respectively. Individual cracks of the tested segmentors were checked by means of a "penetration test", and each of the cracked parts was cut off and the crack-depths were measured by means of a microscope.

The obtained results are shown in Table 2. For the plastic parts made from the conventional 6-nylon (No. 104), cracks of 3.0 mm deep were produced after only 5 cycles, while the segmentor cases according to the present invention, as shown as No. 9 to 13, had the cracks of only 0 to 0.8 mm deep even after 20 cycles of testing. The crack propagation of the plastic parts of the present invention was remarkably slow. Especially, in the segmentor cases made from 6,12-nylon, a blend of 6,6-nylon/6,12-nylon=1/1, a blend of 6,6-nylon/Olefinic Ionomer=1/1, there were never found any cracks at all.

Embodiment 3

This embodiment relates to a canistor case 4 shown in FIG. 3. Several kinds of canistor cases were made from the thermo-plastics resins shown in Table 3, by injection-molding.

The symbols in Table 3, D, G, J, and Y correspond to the corresponding expression D, G, J and Y in Table 1.

The molded products, Nos. 14 to 16 in Table 3 are all the plastic parts according to the present invention, While Nos. 105 and 106 are both conventional plastic parts. As the pre-treatment, at first, the plastic parts being in an absolutely dry condition were put in a constant temperature-humidity bath, the atmosphere of which had a temperature of 80° C. and a relative humidity of 95%. The plastic parts were kept for 33 hrs, then taken out, and left at room temperature for 12 hrs. Next, the parts were submitted to the cycle tests wherein each pre-treated plastic part was coated on the surface thereof with 5% calcium chloride aqueous solution, left in an atmosphere of 100° C. for 2 hrs, left at room temperature for 1 hr, and washed with water. One series of such processing was taken as one cycle, and such cycle or cycles were applied to the plastic parts.

Practically, several plastic parts were tested at the same time. And each one of the plastic parts was taken out after the corresponding cycle or cycles of 1, 10 and 20 respectively. Cracks were checked by means of a "penetration test", then each cracked part was cut off, and the crack-depth was measured by means of a microscope.

Obtained results are shown in Table 3. For the plastic parts made from the conventional 6,6-nylon, regardless of whether they contain glass fibers or not, had the cracks of 1.7 to 1.8 mm deep after only 10 testing cycles, while for the canistor cases according to the present invention, there were never found any cracks at all, even at 20 testing cycles.

Embodiment 4

This embodiment is an alternator fan composed of a base 5 and blades 6, which is shown in FIG. 4.

As the resin forming the base 5 and blades 6 of the alternator the thermoplastic resins shown in Table 4 were used, and injection molded. The symbols F and Y in Table 4 show the same thermoplastic resins as those shown in Table 1.

A plastic part of No. 17 in Table 4 is a plastic part according to the present invention, while a plastic part of No. 107 is a conventional plastic part. As for the test for evaluating the resistance of the plastic parts, the test employed in Embodiment 3 was carried out in this embodiment.

The obtained test results are shown together in Table 4. The plastic part of No. 107 which was made from conventional 6,6-nylon had cracks of 1.9 mm deep after 20 testing cycles, while in the alternator fan No. 17 of the present invention no cracks were found even after 20 testing cycles.

Embodiment 5

As for this embodiment, there are supposed various possible plastic parts, and 20 mm×20 mm×3 mm square plate 7 shown in a FIG. 7 was taken as a typical example of the plastic parts of the present invention.

As polyamide resins, the thermoplastic resins shown in Table 5 were employed. The symbols D, E, F, G, H, I and J in Table 5 show the same resin as the corresponding symbols in Table 1 respectively. The symbols L, M, N, O and P show a blend of 6,6-nylon/6,12-nylon=3/7, a blend of 6,6-nylon/11-nylon=1/1, a blend of 6-nylon/Olefinic Ionomer=1/1 and nylon MXD6 having arpsomatic ring in molecular chains respectively. Nos. 18 to 36 in Table 5 are all the plastic parts according to the present invention, while Nos. 108 to 112 are the conventional plastic parts. No. 201 is an example for comparision. As for the test, after the square plates (20 mm×20 mm×3 mm) were boiled in water of 100° C. for 40 hrs, they were cooled at the room temperature. Then the plates were subjected to the cycle tests. At first 5% calcium chloride aqueous solution was wholly coated on one of the front and back surfaces of each said plate, dried in a 100° C. oven for 2 hrs, cooled at the room temperature, washed with water, and the series of the aforementioned processing was taken as the first cycle. After this, the plates were boiled in water, the aqueous calcium chloride solution is wholly coated on the same surface as in the first cycle, dried in an 100° C. oven for 2 hrs, cooled, washed with water and this series of processings was taken as the second cycle. Hereafter, if necessary, the same cycle as the second cycle was repeatedly applied to the plates. Practically several plates of each number were tested together at 1, 5, 10, 20 and 40 cycles, respectively, and one of the corresponding plates was taken out at the corresponding cycle test, and the cracks thereof were checked by means of a "penetration test", each cracked part was cut off, and the cracked-depth was measured by means of a microscope.

Obtained results are shown together in Table 5. When the conventional 6-nylon, 6,6-nylon are used for the plates, the plates which did not include glass fibers had a crack of 2.5 mm deep at one cycle, while the plates including said fibers had cracks of 1.4 to 1.6 mm deep at 40 cycles.

In contrast, the plates according to the present invention had cracks of only 0 to 0.3 mm deep even at 40 cycles, and there was found an extreamly slow crack growth, especially for the plate made from 6,12-nylon and the blend of 6,6-nylon/Olefinic Ionomer=6/4, the crack appearance was not obserbed at all. However, the plate made from Nylon MXD6 for comparision had a crack of 3.0 mm deep at 20 cycles, and it is obvious that the crack growth is more remarkable than in the conventional 6-nylon and 6,6-nylon.

TABLE 1

| Sample No. | Materials Resin Water Absorpability | Glass fiber contents (%) (wt %) | Testing Method | Crack depth after testing at given cycle or cycles (mm) | | | | Remarks |
|---|---|---|---|---|---|---|---|---|
| | | | | 10 | 20 | 40 | 100 | |
| 1 | D (3) | 33 | A | 0.0 | 0.0 | 0.0 | 0.0 | |
| | | | B | 0.0 | 0.0 | 0.0 | 0.0 | |
| | | | C | 0.0 | 0.0 | 0.0 | 0.0 | |
| 2 | E (4) | 33 | A | 0.0 | 0.1 | 0.3 | — | |
| | | | B | 0.3 | 0.5 | 0.7 | — | |
| | | | C | 0.3 | 0.3 | 0.7 | — | |
| 3 | F (5.5) | 33 | A | 0.0 | 0.0 | 0.0 | — | |
| | | | B | 0.1 | 0.2 | 0.5 | — | |
| | | | C | 0.0 | 0.2 | 0.4 | — | |
| 4 | G (6) | 45 | A | 0.2 | 0.2 | 0.4 | — | |
| | | | B | 0.3 | 0.6 | 0.0 | — | |
| | | | C | 0.3 | 0.4 | 0.7 | — | |
| 5 | H (4.7) | 45 | A | 0.2 | 0.3 | 0.6 | — | |
| | | | B | 0.3 | 0.5 | 0.7 | — | |
| | | | C | 0.3 | 0.4 | 0.7 | — | |
| 6 | I (5.6) | 33 | A | 0.3 | 0.4 | 0.8 | — | |
| | | | B | 0.5 | 0.7 | 1.2 | — | |
| | | | C | 0.4 | 0.6 | 1.2 | — | |
| 7 | J (4.8) | 33 | A | 0.0 | 0.0 | 0.0 | — | |
| | | | B | 0.0 | 0.0 | 0.0 | — | |
| | | | C | 0.0 | 0.0 | 0.0 | — | |
| 8 | J (4.8) | 45 | A | 0.0 | 0.0 | 0.0 | — | |
| | | | B | 0.0 | 0.0 | 0.0 | — | |
| | | | C | 0.0 | 0.0 | 0.0 | — | |
| 101 | Y (8) | 30 | A | 1.6 | 2.0 | 2.2 | — | |
| | | | B | 2.2 | 2.3 | 2.4 | — | |
| | | | C | 2.0 | 2.2 | 2.5 | — | Perforated at 90 cycles |
| 102 | Y (8) | 45 | A | 1.9 | 2.0 | 2.2 | — | |
| | | | B | 2.2 | 2.3 | 2.5 | — | |
| | | | C | 2.1 | 2.3 | 2.4 | — | Perforated at 90 cycles |

TABLE 1-continued

| Sample No. | Resin Water Absorbability | Glass fiber contents (wt %) | Testing Method | Crack depth after testing at given cycle or cycles (mm) | | | | Remarks |
|---|---|---|---|---|---|---|---|---|
| | | | | 10 | 20 | 40 | 100 | |
| 103 | Z (10.7) | 30 | A | 2.0 | 2.2 | 2.6 | — | |
| | | | B | 2.2 | 2.4 | 2.7 | — | |
| | | | C | 2.1 | 2.2 | 2.7 | — | |

TABLE 2

| Sample No. | Resin Water Absorbability | Glass fiber contents (%) | Crack depth after testing at given cycle or cycles (mm) | | | | Remarks |
|---|---|---|---|---|---|---|---|
| | | | 1 | 5 | 10 | 20 | |
| 9 | G(6) | 0 | 0.0 | 0.2 | 0.3 | 0.8 | |
| 10 | K(3.2) | 0 | 0.0 | 0.0 | 0.0 | 0.0 | |
| 11 | J(4.8) | 0 | 0.0 | 0.0 | 0.0 | 0.0 | |
| 12 | D(3) | 0 | 0.0 | 0.0 | 0.0 | 0.0 | |
| 13 | F(5.5) | 0 | 0.0 | 0.0 | 0.0 | 0.0 | |
| 104 | Z(10.7) | 0 | 1.5 | 3.0 | — | — | |

TABLE 3

| Sample No. | Resin Water Absorbability | Glass fiber Contents (%) | Crack depth after testing at given cycle or cycles (mm) | | | Remarks |
|---|---|---|---|---|---|---|
| | | | 1 | 10 | 20 | |
| 14 | D(3) | 0 | 0.0 | 0.0 | 0.0 | |
| 15 | G(6) | 0 | 0.0 | 0.0 | 0.0 | |
| 16 | J(4.8) | 0 | 0.0 | 0.0 | 0.0 | |
| 105 | Y(8) | 0 | 0.9 | 1.8 | — | perforated at 12 cycles |
| 106 | Y(8) | 30 | 0.2 | 1.7 | — | |

TABLE 4

| Sample No. | Resin Water Absorbability | Glass fiber contents (%) | Crack depth after testing at given cycle or cycles (mm) | | |
|---|---|---|---|---|---|
| | | | 1 | 10 | 20 |
| 17 | F(5.5) | 45 | 0.2 | 1.6 | 1.9 |
| 107 | Y(8) | 43 | 0.0 | 0.0 | 0.0 |

TABLE 5

| Sample No. | Resin Water Absorbability | Glass fiber contents (%) | Crack depth after testing at given cycle or cycles (mm) | | | | |
|---|---|---|---|---|---|---|---|
| | | | 1 | 5 | 10 | 20 | 40 |
| 18 | D(3) | 0 | 0.0 | 0.0 | 0.0 | 0.0 | 0.0 |
| 19 | D(3) | 33 | 0.0 | 0.0 | 0.0 | 0.0 | 0.0 |
| 20 | D(3) | 43 | 0.0 | 0.0 | 0.0 | 0.0 | 0.0 |
| 21 | E(4) | 33 | 0.0 | 0.0 | 0.0 | 0.0 | 0.0 |
| 22 | F(5.5) | 0 | 0.0 | — | — | — | — |
| 23 | F(5.5) | 33 | 0.0 | 0.0 | 0.0 | 0.2 | 0.2 |
| 24 | L(4.5) | 33 | 0.0 | 0.0 | 0.0 | 0.0 | 0.0 |
| 25 | G(6) | 0 | 0.1 | — | — | — | — |
| 26 | G(6) | 33 | 0.1 | 0.1 | 0.1 | 0.2 | 0.2 |
| 27 | H(4.7) | 45 | 0.1 | 0.1 | 0.2 | 0.2 | 0.3 |
| 28 | M(4.9) | 45 | 0.1 | 0.1 | 0.2 | 0.3 | 0.3 |
| 29 | I(5.6) | 0 | 0.0 | — | — | — | — |
| 30 | I(5.6) | 33 | 0.0 | 0.1 | 0.1 | 0.2 | 0.3 |
| 31 | J(4.8) | 0 | 0.0 | — | — | — | — |
| 32 | J(4.8) | 33 | 0.0 | 0.0 | 0.0 | 0.0 | 0.0 |
| 33 | N(5.3) | 0 | 0.1 | — | — | — | — |
| 34 | N(5.3) | 30 | 0.1 | 0.1 | 0.1 | 0.2 | 0.3 |
| 35 | O(5.4) | 0 | 0.0 | — | — | — | — |
| 36 | O(5.4) | 30 | 0.0 | 0.1 | 0.2 | 0.3 | 0.3 |
| 108 | Y(8) | 0 | 2.5 | — | — | — | — |
| 109 | Y(8) | 30 | 0.2 | 0.4 | 0.7 | 1.2 | 1.5 |
| 110 | Y(8) | 45 | 0.2 | 0.5 | 0.6 | 1.2 | 1.4 |
| 111 | Z(10.7) | 0 | 2.8 | — | — | — | — |
| 112 | Z(10.7) | 30 | 0.4 | 0.9 | 1.1 | 1.4 | 1.6 |
| 201 | P(5.8) | 30 | 0.4 | 0.9 | 1.3 | 3.0 | 3.0 |

What is claimed is:

1. A formed article having two principal surfaces made of a polyamide resin having a saturation water absorbability of less than 6% when immersed in water at 23° C. and a thickness greater than 1.0 mm, the formed article being resistant to environmental stress cracking when exposed to calcium chloride deicing salts and subjected to repeated heating above 60° C., the article having one surface adapted for constant contact with water or a water-containing liquid, and the other surface exposed to the ambient atmosphere optionally including calcium chloride solution, the article composed of 6-nylon or 6,6-nylon blended with one of 6,10-nylon, 6,12-nylon, 11-nylon, 12-nylon or an olefinic ionomer.

2. A plastic part resistant to deicing salts, at least a portion which having a thickness greater than 1.0 mm and, in use, is subjected to repeated heating to a temperature higher than 60° C., the part having one side in contact with water or a moist atmosphere and the other side in contact with ambient air, the plastic part composed of (i) 6-nylon blended with 6,10-nylon, 6,12-nylon, 11-nylon, 12-nylon or an olefinic ionomer, or (ii) 6,6-nylon blended with 6,10-nylon, 6,12-nylon, 11-nylon, 12-nylon or an olefinic ionomer, the blend having a saturation water absorbability less than 6.0%.

3. A plastic part resistant to deicing salts, at least a portion which having a thickness greater than 1.0 mm and, in use, is subjected to repeated heating to a temperature higher than 60° C., the part having one side in contact with water or a moist atmosphere and the other side in contact with ambient air, the plastic part composed of 6,6-nylon blended with at least 30% of a resin that is mutually soluble in 6,6-nylon and selected from 6,10-nylon, 6,12-nylon, 11-nylon, 12-nylon or an olefinic ionomer, the blend having a saturation water absorbability less than 6.0%.

4. The plastic part of claim 3, in which resin selected is 6,10-nylon.

5. The plastic part of claim 3, in which resin selected is 6,12-nylon.

6. The plastic part of claim 3, in which resin selected is 11-nylon.

7. The plastic part of claim 3, in which resin selected is 12-nylon.

8. The plastic part of claim 3, in which resin selected is an olefinic ionomer.

* * * * *